(12) United States Patent
Huang et al.

(10) Patent No.: US 11,038,740 B2
(45) Date of Patent: Jun. 15, 2021

(54) COMMUNICATION SYSTEM

(71) Applicant: NATIONAL CHIAO TUNG UNIVERSITY, Hsinchu (TW)

(72) Inventors: Zheng-Chun Huang, Taipei (TW); Wei-Che Lee, Taoyuan (TW); Hung-Chih Liu, Taipei (TW); Chih-Wei Jen, New Taipei (TW); Shyh-Jye Jou, Hsinchu County (TW); Yu-Hwai Tseng, New Taipei (TW)

(73) Assignee: NATIONAL CHIAO TUNG UNIVERSITY, Hsinchu (TW)

( * ) Notice: Subject to any disclaimer, the term of this patent is extended or adjusted under 35 U.S.C. 154(b) by 0 days.

(21) Appl. No.: 17/072,013

(22) Filed: Oct. 15, 2020

(65) Prior Publication Data
US 2021/0119851 A1 Apr. 22, 2021

(30) Foreign Application Priority Data

Oct. 22, 2019 (TW) ................................. 108138101

(51) Int. Cl.
*H04L 27/36* (2006.01)
*H04L 27/38* (2006.01)
(Continued)

(52) U.S. Cl.
CPC ........ *H04L 27/3863* (2013.01); *H04L 25/022* (2013.01); *H04L 25/03267* (2013.01)

(58) Field of Classification Search
CPC ... H04L 27/368; H04L 27/0002; H04L 27/36; H04B 17/0085; H04B 17/14; H04B 17/21; H03D 3/009
See application file for complete search history.

(56) References Cited

U.S. PATENT DOCUMENTS 7,174,146 B2   2/2007   Wu et al.
8,295,845 B1   10/2012  Abdollahi-Alibeik et al.
(Continued)

FOREIGN PATENT DOCUMENTS

CN   104580060 A   4/2015
CN   103312640 B   10/2015
(Continued)

OTHER PUBLICATIONS

Changming Zhang et al., "Robust IQ imbalance estimation and compensation via specific preamble for 60 GHz systems", 2013 IEEE Wireless Communications and Networking Conference (WCNC), pp. 4134-4139.

(Continued)

*Primary Examiner* — David S Huang
(74) *Attorney, Agent, or Firm* — CKC & Partners Co., LLC

(57) ABSTRACT

A communication system includes a baseband circuit, a transmitting end circuit, and a receiving end circuit is disclosed. The transmitting end circuit includes a digital analog conversion circuit and a transmitting end filtering circuit. The receiving end circuit includes a receiving end amplifying circuit, a receiving end filtering circuit, and an analog digital conversion circuit. A first data signal is transmitted to the analog digital conversion circuit through the digital analog conversion circuit and the transmitting end filtering circuit, so that the baseband circuit obtains a first compensation parameter. A second data signal is transmitted to the receiving end filtering circuit, the receiving end amplifying circuit and the analog digital conversion circuit through the digital analog conversion circuit and the transmitting end filtering circuit, so that the baseband circuit obtains a second compensation parameter. The baseband (Continued)

circuit performs calibration according to the first and the second compensation parameter.

10 Claims, 3 Drawing Sheets

(51) Int. Cl.
   *H04L 25/02* (2006.01)
   *H04L 25/03* (2006.01)

(56) References Cited

U.S. PATENT DOCUMENTS

| | | | |
|---|---|---|---|
| 2008/0137772 A1* | 6/2008 | Behzad | H04L 27/368 375/296 |
| 2009/0233562 A1* | 9/2009 | Kim | H04B 17/14 455/115.1 |
| 2016/0197685 A1* | 7/2016 | Tsai | H04B 17/29 370/242 |

FOREIGN PATENT DOCUMENTS

| | | |
|---|---|---|
| TW | I246286 B | 12/2005 |
| TW | I256204 B | 6/2006 |
| TW | I264193 B | 10/2006 |
| TW | I302404 B | 10/2008 |
| TW | I477119 B | 3/2015 |
| TW | I530134 B | 4/2016 |

OTHER PUBLICATIONS

Lei Chen et al.,"Golay Sequence Based Time-Domain Compensation of Frequency-Dependent I/Q Imbalance", China Communications, Jun. 2014, pp. 1-11.

* cited by examiner

COMMUNICATION SYSTEM

CROSS-REFERENCE TO RELATED APPLICATION

This application claims the priority benefit of Taiwan application serial no. 108138101, filed Oct. 22, 2019, the full disclosure of which is incorporated herein by reference.

BACKGROUND

Field of Invention

The invention relates to a communication system. More particularly, the invention relates to a communication system related to I/Q channel mismatch estimation and compensation correction.

Description of Related Art

In the wireless communication system, in-phase and quadrature-phase mismatch may cause data transmission demodulation error at the data transmitting end and the receiving end, in which the data error rate is increased. There are many reasons for the in-phase (I)/quadrature (Q) mismatch, which can be roughly divided into two parts: First, since the phase of the in-phase (I)/quadrature (Q) signal output by the local oscillator is not accurate, the phase difference between the two is not the right 90 degrees. The other part is caused by the mismatch between the circuit components in the system. For example, the mismatch between the mixer and the filtering circuit in the I and Q channels makes the in-phases/quadrature signals produce different signal amplitudes.

SUMMARY

An aspect of this disclosure is to provide a communication system. The communication system includes a baseband circuit, a transmitting end circuit, and a receiving end circuit. The transmitting end circuit is coupled to the baseband circuit. The transmitting end circuit includes a digital analog conversion circuit and a transmitting end filtering circuit. The receiving end circuit is coupled to the baseband circuit. The receiving end circuit includes a receiving end amplifying circuit, a receiving end filtering circuit, and an analog digital conversion circuit. A first data signal is transmitted to the analog digital conversion circuit of the receiving end circuit through the digital analog conversion circuit and the transmitting end filtering circuit, so that the baseband circuit obtains a first compensation parameter. A second data signal is transmitted to the receiving end filtering circuit, the receiving end amplifying circuit and the analog digital conversion circuit through the digital analog conversion circuit and the transmitting end filtering circuit, so that the baseband circuit obtains a second compensation parameter. The baseband circuit performs calibration according to the first compensation parameter and the second compensation parameter.

BRIEF DESCRIPTION OF THE DRAWINGS

Aspects of the present disclosure are best understood from the following detailed description when read with the accompanying figures. It is noted that, according to the standard practice in the industry, various features are not drawn to scale. In fact, the dimensions of the various features may be arbitrarily increased or reduced for clarity of discussion.

DETAILED DESCRIPTION

Figure 1:
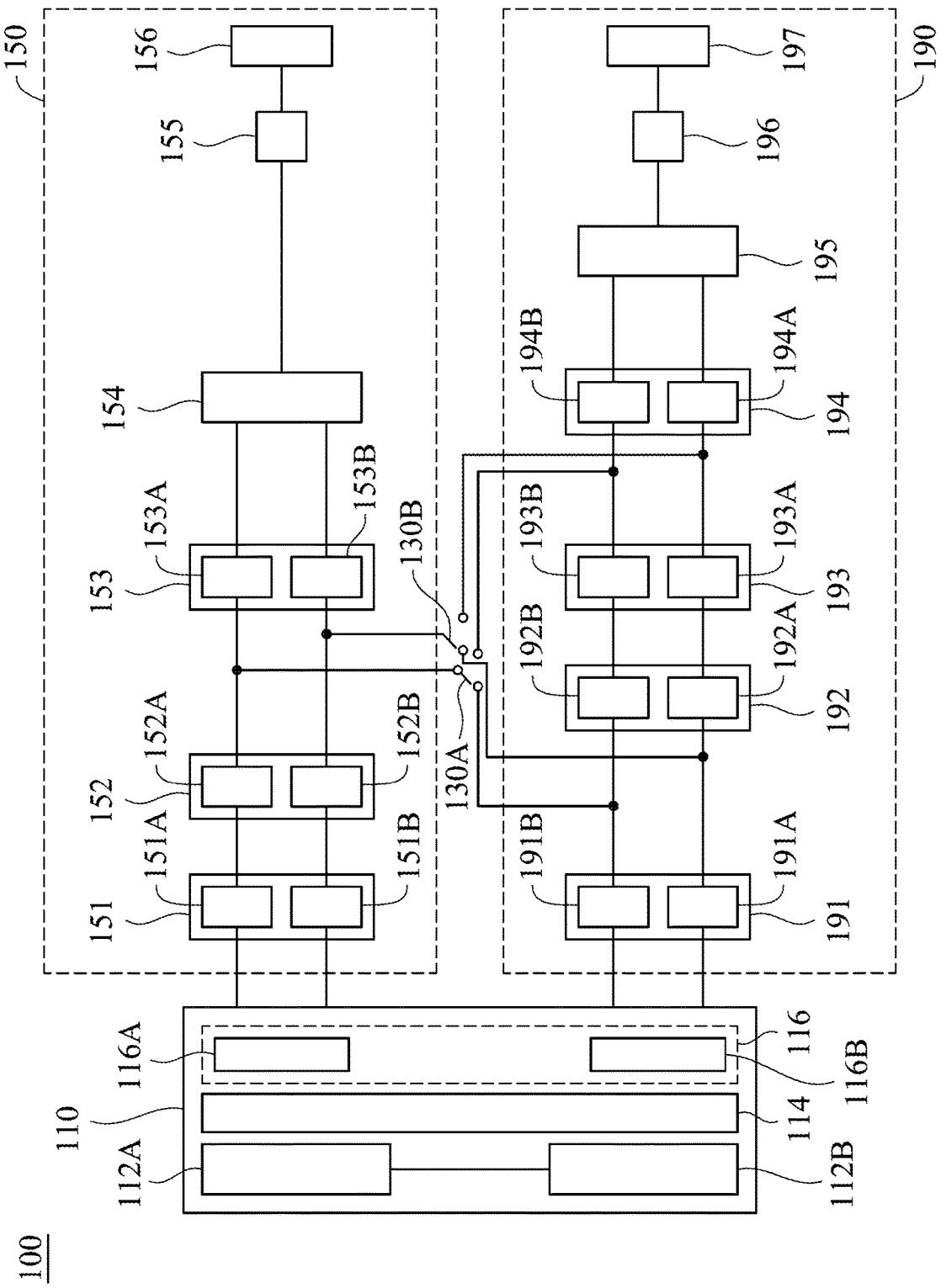
FIG. 1 is a schematic diagram illustrating a communication system according to some embodiments of the present disclosure.

The following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention.

Reference is made to FIG. 1. FIG. 1 is a schematic diagram illustrating a communication system 100 according to some embodiments of the present disclosure. As illustrated in FIG. 1, the communication system 100 includes a baseband circuit 110, a switch 130A, a switch 130B, a transmitting end circuit 150 and a receiving end circuit 190. In the connection relationship, the transmitting end circuit 150 and the receiving end circuit 190 respectively coupled to the baseband circuit 110.

The transmitting end circuit 150 includes a digital analog conversion circuit 151, a transmitting end filtering circuit 152, a transmitting end mixer circuit 153, a transmitting end addition circuit 154, a transmitting end amplifying circuit 155, and a transmitting end antenna circuit 156. In the connection relationship, the digital analog conversion circuit 151 is coupled to the transmitting end filtering circuit 152, the transmitting end filtering circuit 152 is coupled to the transmitting end mixer circuit 153, the transmitting end mixer circuit 153 is coupled to the transmitting end addition circuit 154, the transmitting end addition circuit 154 is coupled to the transmitting end amplifying circuit 155, the transmitting end amplifying circuit 155 is coupled to the transmitting end antenna circuit 156.

As illustrated in FIG. 1, the digital analog conversion circuit 151 includes the sub digital analog conversion circuits 151A and 151B. The transmitting end filtering circuit 152 includes the sub transmitting end filtering circuits 152A and 152B. The transmitting end mixer circuit 153 includes the sub transmitting end mixer circuits 153A and 153B.

On the other hand, the receiving end circuit 190 includes the analog digital conversion circuit 191, the receiving end amplifying circuit 192, the receiving end filtering circuit 193, the receiving end mixer circuit 194, the receiving end addition circuit 195, the low noise amplifier 196 and the receiving end antenna circuit 197. In the connection relationship, the analog digital conversion circuit 191 is coupled to the receiving end amplifying circuit 192, the receiving end amplifying circuit 192 is coupled to the receiving end filtering circuit 193, the receiving end filtering circuit 193 is coupled to the receiving end mixer circuit 194, the receiving end mixer circuit 194 is coupled to the receiving end addition circuit 195, the receiving end addition circuit 195 is coupled to the low noise amplifier 196, the low noise amplifier 196 is coupled to the receiving end antenna circuit 197.

As illustrated in FIG. 1, the analog digital conversion circuit 191 includes the sub analog digital conversion circuits 191A and 191B, the receiving end amplifying circuit 192 includes the sub receiving end amplifying circuits 192A and 192B, the receiving end filtering circuit 193 includes the sub receiving end filtering circuits 193A and 193B, the receiving end mixer circuit 194 includes the sub receiving end mixer circuits 194A and 194B.

Furthermore, the baseband circuit 110 includes the transmitting end sub baseband circuit 112A, the receiving end sub baseband circuit 112B, the control circuit 114, and the calibration circuit 116. The calibration circuit includes the sub calibration circuits 116A and 116B. In the connection relationship, the transmitting end sub baseband circuit 112A and the receiving end sub baseband circuit 112B are coupled to the control circuit 114, and the control circuit 114 is coupled to the calibration circuit 116.

As illustrated in FIG. 1, one end of the switch 130A is coupled between the sub transmitting end filtering circuit 152A and the sub transmitting end mixer circuit 153A, another end of the switch 130A is selectively connected between the sub analog digital conversion circuit 191A and the sub receiving end amplifying circuit 192A, or between the sub receiving end filtering circuit 193A and the sub receiving end mixer circuit 194A, or not connected to any circuits. One end of the switch 130B is connected between the sub transmitting end filtering circuit 152B and the sub transmitting end mixer circuit 153B, another end of the switch 130B is selectively connected between the sub analog digital conversion circuit 191B and the sub receiving end amplifying circuit 192B, or between the sub receiving end filtering circuit 193B and the sub receiving end mixer circuit 194B, or not connected to any circuits.

Figure 2:
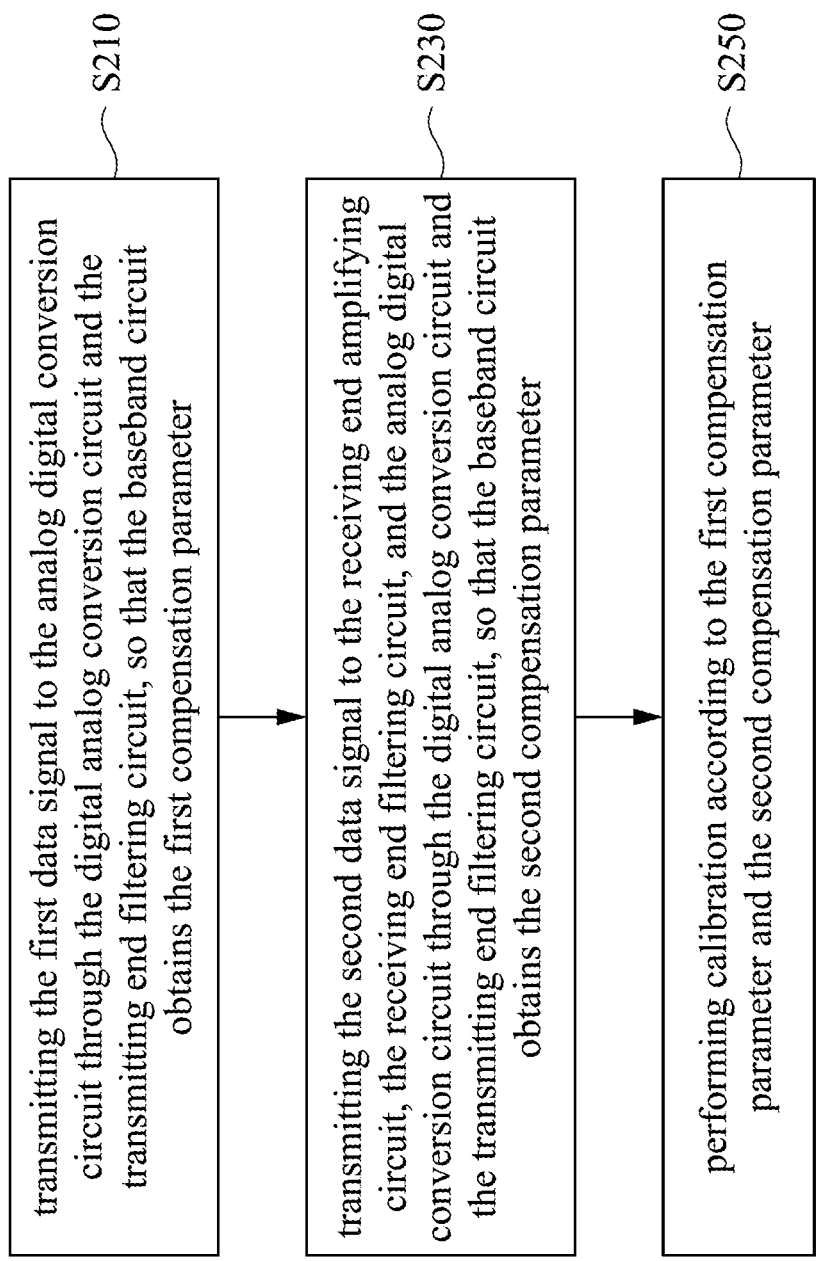
FIG. 2 is a flowchart of the operation method according to some embodiments of the present disclosure.

The details of the embodiments of the present disclosure are disclosed below with reference to FIG. 2, FIG. 2 is a flowchart of the operation method 200 applicable to the communication system 100 in FIG. 1. However, the embodiments of the present disclosure are not limited thereto.

Reference is made to FIG. 2. FIG. 2 is a flowchart of the operation method 200 according to some embodiments of the present disclosure. However, the embodiments of the present disclosure are not limited thereto.

Furthermore, is should be noted that, the operations of the operation method mentioned in the present embodiment can be adjusted according to actual needs except for those whose sequences are specifically stated, and can even be executed simultaneously or partially simultaneously.

Furthermore, in different embodiments, these operations may also be adaptively added, replaced, and/or omitted.

Reference is made to FIG. 2. Operation method 200 includes the following operations.

In operation S210, the first data signal to the analog digital conversion circuit is transmitted through the digital analog conversion circuit and the transmitting end filtering circuit, so that the baseband circuit obtains the first compensation parameter. Reference is made to FIG. 1. In some embodiments, In operation S210, one end of the switch 130A switches to be connected to the input terminal of the sub analog digital conversion circuit 191A, one end of the switch 130B switches to be connected to the input terminal of the sub analog digital conversion circuit 191B. In this way, when the first data signal is sent out from the baseband circuit 110, after the in-phase data signal of the first data signal (I signal) is sent out by the baseband circuit 110, the in-phase data signal of the first data signal passes by and is sent out by the sub digital analog conversion circuit 151A, the sub transmitting end filtering circuit 152A, the in-phase data signal passes by the switch 130A and is transmitted to the sub analog digital conversion circuit 191A, the in-phase data signal is further transmitted to the baseband circuit 110. On the other hand, after the quadrature data signal of the first data signal (Q signal) is sent out by the baseband circuit 110, the quadrature data signal passes by and is sent out by the sub digital analog conversion circuit 151B, the sub transmitting end filtering circuit 152B, the quadrature data signal passes by the switch 130B and is transmitted to the sub analog digital conversion circuit 191B, the quadrature data signal is further transmitted to the baseband circuit 110.

As mentioned above, due to the setting of the switches 130A and 130B, after the first data signal is sent out by the baseband circuit 110, the first data signal does not passed by the transmitting end mixer circuit 153, the receiving end amplifying circuit 192, the receiving end filtering circuit 193, the receiving end mixer circuit 194. Instead, the first data signal passes by the analog digital conversion circuit 191 and is transferred back to the baseband circuit 110. In this way, the baseband circuit 110 may eliminate the errors caused by the transmitting end mixer circuit 153, the receiving end mixer circuit 194, the receiving end filtering circuit 193, and the receiving end amplifying circuit 192, so as to estimate the errors caused by the transmitting end filtering circuit 152, and to estimate the first compensation parameter to compensate the error generated by the transmitting end filtering circuit 152.

In operation S230, the second data signal is transmitted to the receiving end amplifying circuit, the receiving end filtering circuit, and the analog digital conversion circuit through the digital analog conversion circuit and the transmitting end filtering circuit, so that the baseband circuit obtains the second compensation parameter. Reference is made to FIG. 1. In some embodiments, in operation S230, one end of the switch 130A is switches to be connected to the input terminal of the sub receiving end filtering circuit 193A, one end of the switch 130B is switches to be connected to the input terminal of the sub receiving end filtering circuit 193B. In this way, when the second data signal is sent out from the baseband circuit 110, after the in-phase data signal of the second data signal is sent out by the baseband circuit 110, after the in-phase data signal passes by and is sent out by the sub digital analog conversion circuit 151A and the sub transmitting end filtering circuit 152A, the in-phase data signal (I signal) passes by the switch 130A and is transmitted to the sub receiving end filtering circuit 193A, the in-phase data signal further passes by the sub receiving end filtering circuit 193A, the receiving end amplifying circuit 192A, the sub analog digital conversion circuit 191A and is transmitted to the baseband circuit 110. On the other hand, after the orthogonal data signal (Q signal) of the second data signal is sent out from the baseband circuit 110, the orthogonal data signal passes by and is sent out by the sub digital analog conversion circuit 151B, the sub transmitting end filtering circuit 152B, the orthogonal data signal passes by the switch 130B and is transmitted to the sub receiving end filtering circuit 193B, the orthogonal data signal further passes by the sub receiving end filtering circuit 193B, the receiving end amplifying circuit 192B, the sub analog digital conversion circuit 191B and is transmitted to the baseband circuit 110.

As mentioned above, due to the setting of the switches 130A and 130B, after the first data signal is sent out from the baseband circuit 110, the first data signal does not passed by the receiving end mixer circuit 194. Instead, the first data signal passes by the receiving end filtering circuit 193, the receiving end amplifying circuit 192, and the analog digital conversion circuit 191 and is transmitted back to the baseband circuit 110. In this way, the baseband circuit 110 eliminates errors cause by the receiving end mixer circuit 194, so as to estimate the error generated by the receiving end filtering circuit 193, and to estimate the second compensation parameter for compensating the error generated by the receive end filtering circuit 193.

In some embodiments, in operation S210 and S230, the control circuit 114 controlled the another end of the switches 130A and 130B to be connected to the input terminal of the analog digital conversion circuit 191, the input terminal of the receiving end filtering circuit 193, or not connected to any circuits.

Furthermore, in some embodiments, the switches 130A and 130B include a first sub switch and a second sub switch (not illustrated). One end of the first sub switch is connected to an output terminal of the transmitting end filtering circuit 152, another end of the first sub switch is connected to input terminal of the analog digital conversion circuit 191 of the receiving end. When the first sub switch is performed, the first data signal is transmitted to the analog digital conversion circuit 191 through the transmitting end filtering circuit 152. One end of the second sub switch is also connected to an output terminal of the transmitting end filtering circuit 152, and another end of the second sub switch is connected to the input terminal of the receiving end filtering circuit 193. When the second sub switch is performed, the second data signal passes by the transmitting end filtering circuit 152 and is transmitted to the receiving end filtering circuit 193, the receiving end amplifying circuit 192, and the analog digital conversion circuit 191.

In operation S250, calibration is performed according to the first compensation parameter and the second compensation parameter. In some embodiments, in operation S250, the first compensation parameter is stored by the sub calibration circuit 116A and the pre-distortion compensation is performed according to the first compensation parameter, and the second compensation parameter is stored by the sub calibration circuit 116B and the post distortion compensation is performed according to the second compensation parameter.

Figure 3:
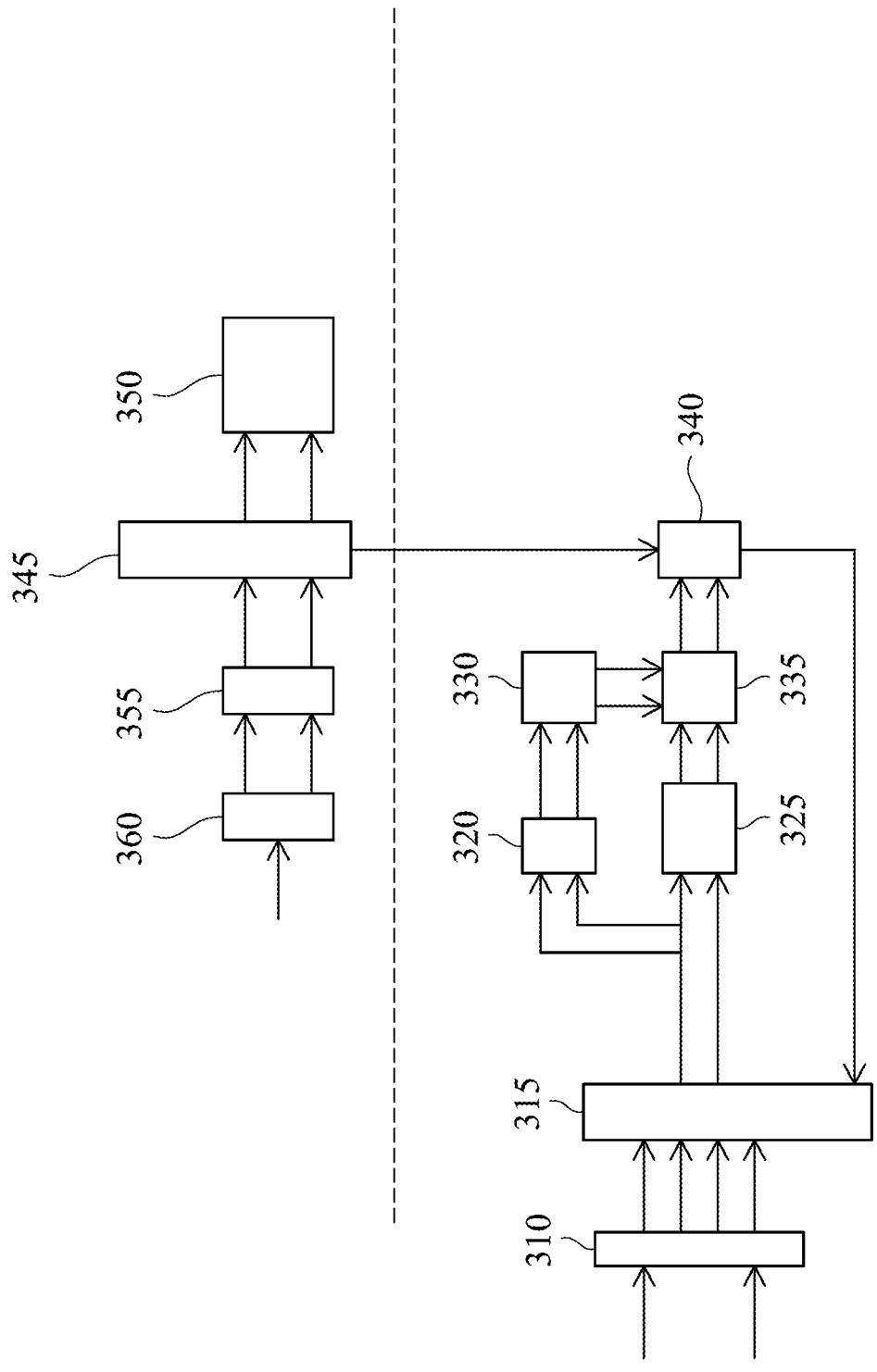
FIG. 3 is a schematic diagram illustrating a baseband circuit according to some embodiments of the present disclosure.

Reference is made to FIG. 3 at the same time. FIG. 3 is a schematic diagram illustrating a baseband circuit 110 according to some embodiments of the present disclosure. As illustrated in FIG. 3, the baseband circuit 110 includes the synchronization circuit 310, the receiving end equalization filtering circuit 315, the channel estimation circuit 320, the Fourier transform circuit 325, the Fourier transform circuit 330, the frequency domain equalization circuit 335, the inverse Fourier transform circuit 340, the transferring end equalization filtering circuit 345, the pulse shaping insertion circuit 350, the pilot word insertion circuit 355, and the mapping circuit 360. In some embodiments, the inverse Fourier transform circuit 340, the transferring end equalization filtering circuit 345, the pulse shaping insertion circuit 350, the pilot word insertion circuit 355, and the mapping circuit 360 are included in the transmitting end sub baseband circuit 112A, and the synchronization circuit 310, the receiving end equalization filtering circuit 315, the channel estimation circuit 320, the Fourier transform circuit 325, the Fourier transform circuit 330, the frequency domain equalization circuit 335, and the inverse Fourier transform circuit 340 are included in the receiving end sub baseband circuit 112B. The baseband circuit 110 as illustrated in FIG. 3 is for illustrative purposes only, and the embodiments of the present disclosure are not limited thereto.

In some embodiments, in operation S250, the transferring end equalization filtering circuit 345 performs the IQ mismatch compensation between the transmitting end circuits 150A and 150B of FIG. 1 according to the first compensation parameter, the receiving end equalization filtering circuit 315 performs the mismatch compensation of the receiving end circuit 190 according to the second compensation parameter.

In some embodiments, the first compensation parameter and the second compensation parameter are collaborative estimated by the channel estimation circuit 320, the frequency domain equalization circuit 335, the Fourier transform circuit 330, and the inverse Fourier transform circuit (IFFT) circuit 340 of the baseband circuit 110.

In some embodiments, the inverse Fourier transform circuit 340 is configured to generate a first time domain compensation parameter according to the first compensation parameter, and to transmit a first time domain compensation parameter to the transferring end equalization filtering circuit 345 to perform the mismatch compensation. The inverse Fourier transform circuit 340 further generates a second time domain compensation parameter according to the second compensation parameter, and the second time domain compensation parameter is transmitted to the receiving end equalization filtering circuit 315 to perform the mismatch compensation.

In some embodiments, when estimating the first compensation parameter and the second compensation parameter, the first compensation parameter and the second compensation parameter are estimated according to several preamble data of the several packets of the first data signal and the second data signal. In detail, after estimating out the error of the transmitting end filtering circuit 152 and the receiving end filtering circuit 193, the error value will be embedded in the preamble data, after the Fourier transform circuit 325, the Fourier transform circuit 330, the frequency domain equalization circuit 335, the inverse Fourier transform circuit 340 estimated the first compensation parameter and the second compensation parameter, the first compensation parameter and the second compensation parameter are transferred to the transferring end equalization filtering circuit 345 and the receiving end equalization filtering circuit 315 through different feedback paths, so as to perform compensation corrections.

In some embodiments, the first compensation parameter and the second compensation parameter are frequency dependent error (FD-IQ mismatch) compensation parameters. In some embodiments, after the baseband circuit 110 estimates the first compensation parameter and the second compensation parameter, the baseband circuit stops transmitting the first compensation parameter to the transferring end equalization filtering circuit 345, and the baseband circuit stops transmitting the second compensation parameter to the receiving end equalization filtering circuit 315.

In some embodiments, the receiving end amplifying circuit 192 may be Variable Gain amplifying circuit, Automatic Gain Control amplifying circuit, or other analog fundamental amplifying circuit. In some embodiments, the transferring end equalization filtering circuit 345 and the receiving end equalization filtering circuit 315 are FIR equalization filtering circuit (Filter Equalizer). The transmitting end filtering circuit 152 and the receiving end filtering circuit 193 are Low Pass Filter filtering circuit. In some embodiments, the transmitting end amplifying circuit 155 includes a Power Amplifier and a Variable Gain Amplifier, the low noise amplifier 196 includes a Variable Gain Amplifier and a low noise amplifier (Low Noise Amplifier). Furthermore, in some embodiments, the mapping circuit 360, the pilot word insertion circuit 355, the pulse shaping insertion circuit 350, the synchronization circuit 310, the Fourier transform circuit 325, the Fourier transform circuit 330, and the inverse Fourier transform circuit 340 as illustrated in FIG. 3 are the original circuits of the communication system, and the transferring end equalization filtering circuit 345, the receiving end equalization filtering circuit 315, the channel estimation circuit 320, and the frequency domain equalization circuit 335 are new added circuits.

According to the embodiment of the present disclosure, it is understood that the embodiment of the present disclosure is to provide a communication system 100, in which a finite impulse response equalization filtering circuit (FIR Filter Equalizer) is added to the I and Q channels of the receiving end and the transferring end of the baseband circuit. At the same time, a diverter switch is added after the output terminal of the I and Q channels of the transferring end (Tx), so as to control the input terminal of the analog digital conversion circuit and the input terminal of the filtering circuit connecting to the I and Q channels of the receiving end (Rx), in order to estimate the undesirable effects generated by the filtering circuit of the receiving end, and the signals are transferred back to a pre-inserted finite impulse response equalization filtering circuit of the I and Q channels of the transferring end (Tx) and the receiving end (Rx). The error amount caused by the frequency dependent error is corrected, and the impact of carrier frequency offset of the estimation is effectively avoided.

In this document, the term "coupled" may also be termed as "electrically coupled", and the term "connected" may be termed as "electrically connected". "coupled" and "connected" may also be used to indicate that two or more elements cooperate or interact with each other. It will be understood that, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. As used herein, the term "and/or" includes any and all combinations of one or more of the associated listed items.

In addition, the above illustrations comprise sequential demonstration operations, but the operations need not be performed in the order shown. The execution of the operations in a different order is within the scope of this disclosure. In the spirit and scope of the embodiments of the present disclosure, the operations may be increased, substituted, changed and/or omitted as the case may be.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A communication system, comprising:
   a baseband circuit;
   a transmitting end circuit, coupled to the baseband circuit, wherein the transmitting end circuit comprises:
   a digital analog conversion circuit; and
   a transmitting end filtering circuit; and
   a receiving end circuit, coupled to the baseband circuit, wherein the receiving end circuit comprises:
   a receiving end amplifying circuit;
   a receiving end filtering circuit; and
   an analog digital conversion circuit;
   wherein a first data signal is transmitted to the analog digital conversion circuit of the receiving end circuit through the digital analog conversion circuit and the transmitting end filtering circuit, so that the baseband circuit obtains a first compensation parameter, wherein a second data signal is transmitted to the receiving end filtering circuit, the receiving end amplifying circuit and the analog digital conversion circuit through the digital analog conversion circuit and the transmitting end filtering circuit, so that the baseband circuit obtains a second compensation parameter, wherein the baseband circuit performs calibration according to the first compensation parameter and the second compensation parameter.

2. The communication system of claim 1, comprising:
   a switch, wherein a first end of the switch is connected to an output terminal of the transmitting end filtering circuit, wherein when a second terminal of the switch is connected to an input terminal of the analog digital conversion circuit, the first data signal passes by the digital analog conversion circuit and the transmitting end filtering circuit, and the first data signal is transmitted to the analog digital conversion circuit, and when the second end of the switch is connected to an input terminal of the receiving end filtering circuit, the second data signal passes by the digital analog conversion circuit and the transmitting end filtering circuit, and the second data signal is transmitted to the receiving end amplifying circuit, the receiving end filtering circuit and the analog digital conversion circuit.

3. The communication system of claim 2, wherein the baseband circuit comprises:
   a control circuit, configured to control the second end of the switch to be connected to the input terminal of the analog digital conversion circuit or the input terminal of the receiving end filtering circuit.

4. The communication system of claim 3, wherein the baseband circuit further comprises:
   a transferring end equalization filtering circuit, configured to perform a mismatch compensation of the transmitting end circuit according to the first compensation parameter; and
   a receiving end equalization filtering circuit, configured to perform a mismatch compensation of the receiving end circuit according to the second compensation parameter.

5. The communication system of claim 4, wherein the first compensation parameter and the second compensation parameter are frequency dependent error (FD-IQ mismatch) compensation parameters.

6. The communication system of claim 4, wherein after estimating the first compensation parameter and the second compensation parameter, the baseband circuit is further configured to stop transmitting the first compensation parameter to the transferring end equalization filtering circuit, and to stop transmitting the second compensation parameter to the receiving end equalization filtering circuit.

7. The communication system of claim 4, wherein the control circuit is further configured to:
   estimating the first compensation parameter and the second compensation parameter according to a plurality of preamble data of a plurality of packets of the first data signal and the second data signal.

8. The communication system of claim 4, wherein the control circuit further comprises:
   an inverse Fourier transform circuit(IFFT), configured to generate a first time domain compensation parameter according to the first compensation parameter, and to transfer the first time domain compensation parameter to the transferring end equalization filtering circuit to perform the mismatch compensation, wherein the inverse Fourier transform circuit further generates a second time domain compensation parameter according to the second compensation parameter, and transmits the second time domain compensation parameter to the receiving end equalization filtering circuit to perform the mismatch compensation.

9. The communication system of claim 3, wherein the first compensation parameter and the second compensation parameter are collaboratively estimated by a channel estimation circuit, a frequency domain equalization circuit, a Fourier transform circuit and an inverse Fourier transform circuit of the baseband circuit.

10. The communication system of claim 1, wherein the baseband circuit comprises:
   a calibration circuit, configured to store the first compensation parameter and the second compensation parameter, to perform a pre-distortion compensation according to the first compensation parameter, and to perform a post-distortion compensation according to the second compensation parameter.

* * * * *